(12) United States Patent
Sumi et al.

(10) Patent No.: US 7,596,527 B2
(45) Date of Patent: Sep. 29, 2009

(54) LOAN ASSET MANAGING SYSTEM AND LOAN ASSET MANAGING METHOD, AND RECORDING MEDIUM AND COMPUTER PROGRAM PRODUCT THEREFOR

(75) Inventors: Moriyasu Sumi, Tokyo (JP); Takumi Maehara, Tokyo (JP)

(73) Assignee: NS Solutions Corporation, Tokyo (JP)

( * ) Notice: Subject to any disclaimer, the term of this patent is extended or adjusted under 35 U.S.C. 154(b) by 1305 days.

(21) Appl. No.: 10/617,701

(22) Filed: Jul. 14, 2003

(65) Prior Publication Data

US 2004/0078322 A1 Apr. 22, 2004

(30) Foreign Application Priority Data

Jul. 23, 2002 (JP) .............................. 2002-214102

(51) Int. Cl.
*G06Q 40/00* (2006.01)
(52) U.S. Cl. .......................................... 705/37; 705/38
(58) Field of Classification Search .................. 705/37, 705/38, 34, 26, 36
See application file for complete search history.

(56) References Cited

U.S. PATENT DOCUMENTS

| | | | | |
|---|---|---|---|---|
| 5,508,731 | A * | 4/1996 | Kohorn | 725/24 |
| 6,026,388 | A * | 2/2000 | Liddy et al. | 707/1 |
| 6,269,346 | B1 * | 7/2001 | Cristofich et al. | 705/36 R |
| 7,003,490 | B1 * | 2/2006 | Keyes | 705/38 |
| 2004/0098329 | A1 * | 5/2004 | Tilton | 705/36 |

FOREIGN PATENT DOCUMENTS

JP 2002197268 A 7/2002

OTHER PUBLICATIONS

Asian Wall Street Journal: Nonperforming Loans in Asia Are Rising, Report Indicates By Alan Yonan Jr.. Asian Wall Street Journal. New York, N.Y.: Jul. 11, 2002. p. M.8).*
Yasuyuki Fuchita, Capital Market Quarterly, Nomura Institute of Capital Markets Research, Winter 2002, "Historical Changes of Money Flow and Direction of Financial Business—Need of Discipline in Variation", vol. 5, No. 3, pp. 2-11; English version of this document is also attached.

* cited by examiner

*Primary Examiner*—Frantzy Poinvil
*Assistant Examiner*—Clement Graham
(74) *Attorney, Agent, or Firm*—Arent Fox LLP

(57) ABSTRACT

A processing section 46 for analyzing residential mortgages analyzes a first portfolio in first residential mortgages based on information on the first residential mortgages and outputs a first analysis result. A processing section 47 for evaluating securities current value analyzes a second portfolio in second residential mortgages in relation to the current value of residential mortgage-based securities that are the results of securitizing the second residential mortgages, based on information on the residential mortgage-based securities and outputs a second analysis result. A processing section 48 for extracting difference compares the first analysis result and the second analysis result to extract a difference between the second portfolio and the first portfolio. A processing section 49 for changing examination conditions changes examination conditions for examining users of residential mortgages based on the difference extracted by the processing section 48 for extracting difference.

20 Claims, 7 Drawing Sheets

F I G. 5

| NAME | AGE | OCCUPATION | YEARLY INCOME | INTEREST RATE | LOAN AMOUNT |
|------|-----|------------|---------------|---------------|-------------|
| ▽▽ | FORTY TWO | FINANCIAL BUSINESS | ○ TEN-MILLION YEN | FIXED 4% | 50 MILLION YEN |
| ○× | FORTY THREE | FINANCIAL BUSINESS | × MILLION YEN | FIXED 4% | 30 MILLION YEN |
| ▽× | THIRTY | CONSTRUCTION BUSINESS | ○ TEN-MILLION YEN | VARIABLE 2% | 30 MILLION YEN |
| ×× | TWENTY | RETAIL BUSINESS | ▽ MILLION YEN | FIXED 6% | 18 MILLION YEN |
| ▽▽ | FORTY FIVE | PUBLIC OFFICIAL | × TEN-MILLION YEN | FIXED 5% | 20 MILLION YEN |
| .. | .. | .. | .. | .. | .. |

GROUP A (30%)
FORTIES x TEN-MILLION YEN OR MORE
THIRTIES y MILLION YEN OR MORE
TWENTIES z MILLION YEN OR MORE

GROUP B (50%)
FORTIES r MILLION YEN OR MORE
THIRTIES s MILLION YEN OR MORE
TWENTIES t MILLION YEN OR MORE

GROUP C (20%)
FORTIES LESS THAN r MILLION YEN
THIRTIES LESS THAN s MILLION YEN
TWENTIES LESS THAN t MILLION YEN

FIG. 6B ~71

GROUP a FINANCIAL BUSINESS (25%)

GROUP b CONSTRUCTION BUSINESS (15%)

GROUP c RETAIL BUSINESS (20%)

GROUP d OTHER (40%)

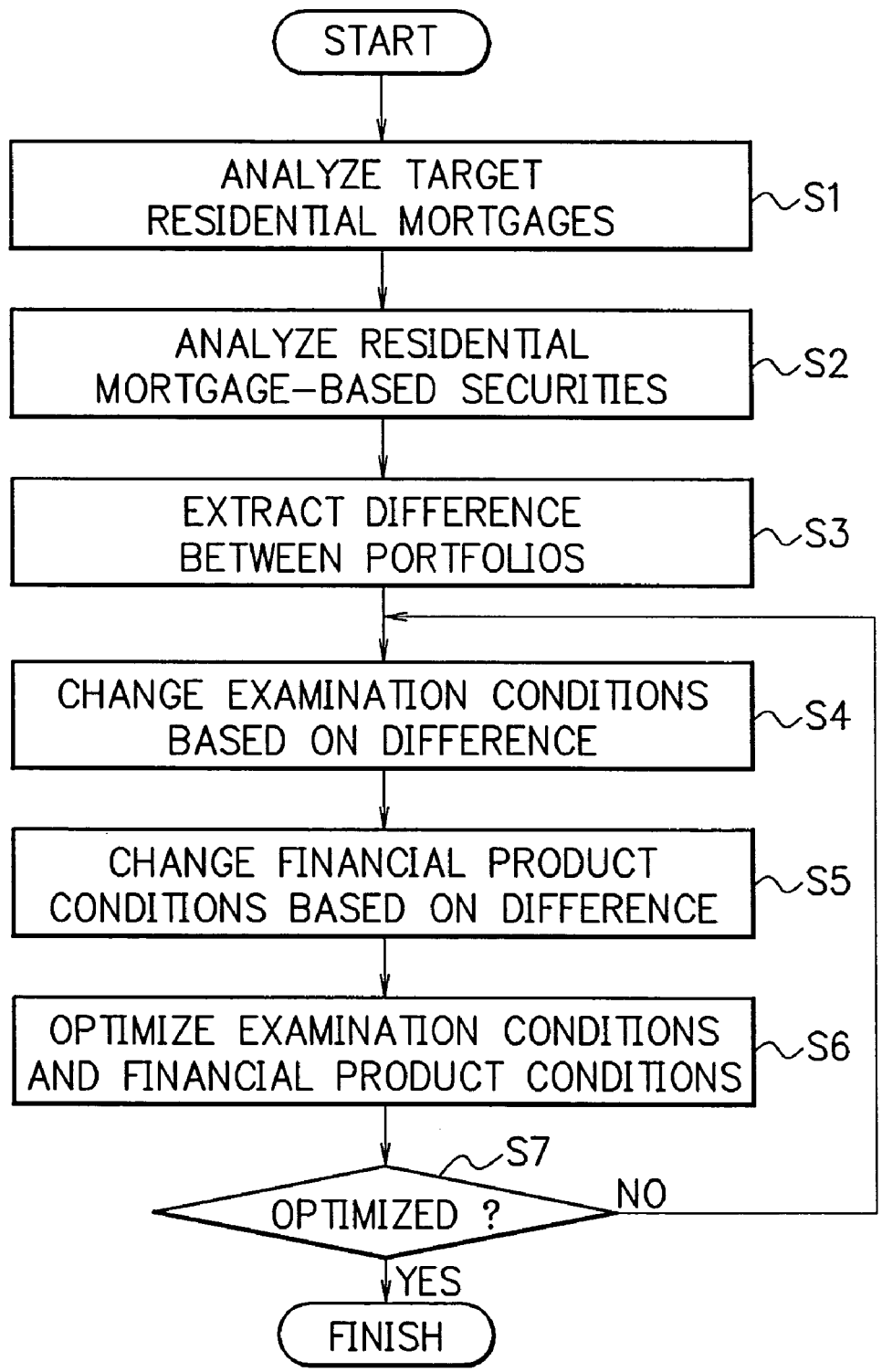

LOAN ASSET MANAGING SYSTEM AND LOAN ASSET MANAGING METHOD, AND RECORDING MEDIUM AND COMPUTER PROGRAM PRODUCT THEREFOR

CROSS-REFERENCE TO RELATED APPLICATIONS

This application is based upon and claims the benefit of priority from the prior Japanese Patent Application No. 2002-214102, filed on Jul. 23, 2002, the entire contents of which are incorporated herein by reference.

BACKGROUND OF THE INVENTION

1. Field of the Invention

The present invention relates to a loan asset managing system and a loan asset managing method for managing loan assets which are formed by lending money or products to users according to financial product conditions, and to a recording medium and a computer program product therefor.

2. Description of the Related Art

In recent years, with the progress of financial liberalization and the enforcement of payoff, profitability, safety, and liquidity of loan assets and so on, for example, residential mortgages and so on are becoming important management objects in financial institutes such as banks. A method of securitizing loan assets is one method for achieving this object. As a method for evaluating the loan assets, a method of preparing a portfolio which is an asset breakdown and the combination of asset distribution, or the like is used.

Concretely, the value of the portfolio of the loan assets constituted of residential mortgages is determined by financial product conditions (amount, term, interest rate, mortgage, . . . ) for the residential mortgages and information on attributes (occupation, age, yearly income, . . . ) of users using the residential mortgages. The aforesaid financial product conditions of the residential mortgages are determined by what kind of financial products (for residential mortgages) is prepared. The tendency of the aforesaid attributes of the users using the residential mortgages is roughly determined by the contents of examination conditions for examining the users. Further, if the aforesaid financial product conditions for the financial products include provisions on occupation and so on, the attributes of the users are partly determined by the provisions.

In accordance with the wide use of the Internet, such a service is being started that enables users to efficiently run simulations of financial product conditions of residential mortgages and repayment plans via the Internet in their own free time.

Presently, however, the financial product conditions of financial products and the examination conditions are not determined from the viewpoint of enhancing the value of the portfolio of loan assets (residential mortgages). Accordingly, there arises such a problem that loan assets (residential mortgages) whose portfolio has a low value is formed.

Further, the low value of the portfolio of the aforesaid loan assets (residential mortgages) results in a problem that it is difficult to securitize the loan assets (residential mortgages). In other words, there is such a problem that the securities of the loan assets (residential mortgages) have a low value when the loan assets (residential mortgages) are securitized.

Further, it has been demanded that STP (Straight Through Processing) be realized that is a mechanism for completing a series of processes from the application for loan assets (residential mortgages) to the determination of the examination and financial product conditions and repayment management as electronic information flow without any use of manpower or paper.

SUMMARY OF THE INVENTION

The present invention is made in consideration of the above-described circumstances, and it is an object of the present invention to provide a loan asset managing system and a loan asset managing method capable of enhancing the value of loan assets (residential mortgages) by enhancing the value of a portfolio of the loan assets (residential mortgages), and to provide a recording medium and a computer program product therefor.

It is another object of the present invention to provide a loan asset managing system and a loan asset managing method facilitating high-price securitization of loan assets (residential mortgages) by enhancing the value of a portfolio of the loan assets (residential mortgages), and to provide a recording medium and a computer program product therefor.

It is still another object of the present invention to provide a loan asset managing system and a loan asset managing method realizing STP that is a mechanism for completing a series of processes from the application for loan assets (residential mortgages) to the determination of examination and financial product conditions and repayment management as electronic information flow without any use of manpower or paper, and to provide a recording medium and a computer program product therefor.

The present invention is made to achieve the abovementioned objects, and a loan asset managing system according to the present invention is characterized in that it includes: a loan asset analyzing means that analyzes a first portfolio in first loan assets formed by lending money or a product to users according to financial product conditions, based on loan asset information that is information on the first loan assets, and outputs a first analysis result; a securities current value evaluating means that analyzes a second portfolio in second loan assets in relation to current values of loan asset-based securities that are results of securitizing the second loan assets, based on information on the loan asset-based securities, and outputs a second analysis result; a difference extracting means that compares the first analysis result outputted by the loan asset analyzing means and the second analysis result outputted by the securities current value evaluating means and extracts a difference between the second portfolio and the first portfolio; and an examination condition changing means that changes examination conditions for examining the users when the money or product is lent to the users, based on the difference extracted by the difference extracting means.

The loan asset managing system according to the present invention is also characterized in that the financial product conditions are determined by the kind of financial product used by the users, and that the loan asset managing system further includes a financial product condition changing means that changes the financial product conditions of the financial product based on the difference extracted by the difference extracting means.

The loan asset managing system according to the present invention is also characterized in that it further includes an optimizing means that makes adjustment of a degree of the change in the examination conditions made by the examination condition changing means and a degree of the change in the financial product conditions made by the financial product condition changing means to optimize these degrees.

The loan asset managing system according to the present invention is also characterized in that it further includes an examining means that examines the users based on information on the users and the examination conditions changed by the examination condition changing means.

The loan asset managing system according to the present invention is also characterized in that it further includes a loan asset managing means that manages a loan asset of the financial product for which the financial product conditions are set, based on the financial product conditions changed by the financial product condition changing means.

The loan asset managing system according to the present invention is also characterized in that the examining means reexamines the users based on user information used in the past examination and the changed examination conditions when the examination condition changing means changes the examination conditions.

A loan asset managing method according to the present invention is characterized in that it includes a first step of analyzing a first portfolio in first loan assets formed by lending money or a product to users according to financial product conditions, based on loan asset information that is information on the first loan assets and outputting a first analysis result; a second step of analyzing a second portfolio in second loan assets in relation to current values of loan asset-based securities that are the results of securitizing the second loan assets, based on information on the loan asset-based securities and outputting a second analysis result; a third step of comparing the first analysis result outputted in the first step and the second analysis result outputted in the second step and extracting a difference between the second portfolio and the first portfolio; and a fourth step of changing examination conditions for examining the users when the money or product is lent to the users, based on the difference extracted in the third step.

The loan asset managing method according to the present invention is also characterized in that the financial product conditions are determined by the kind of financial product used by the users, and that the loan asset managing method further includes a fifth step of changing the financial product conditions of the financial product based on the difference extracted in the third step.

A recording medium according to the present invention is a computer-readable recording medium on which a computer program is recorded, the computer program including: a computer-readable program code means for executing a first step of analyzing a first portfolio in first loan assets formed by lending money or a product to users according to financial product conditions, based on loan asset information that is information on the first loan assets and outputting a first analysis result; a computer-readable program code means for executing a second step of analyzing a second portfolio in second loan assets in relation to current values of loan asset-based securities that are results of securitizing the second loan assets, based on information on the loan asset-based securities, and outputting a second analysis result; a computer-readable program code means for executing a third step of comparing the first analysis result outputted in the first step and the second analysis result outputted in the second step and extracting a difference between the second portfolio and the first portfolio; and a computer-readable program code means for executing a fourth step of changing examination conditions for examining the users when the money or product is lent to the users, based on the difference extracted in the third step.

A computer program product according to the present invention is a computer program product including: a computer-readable program code means for executing a first step of analyzing a first portfolio in first loan assets formed by lending money or a product to users according to financial product conditions, based on loan asset information that is information on the first loan assets and outputting a first analysis result; a computer-readable program code means for executing a second step of analyzing a second portfolio in second loan assets in relation to current values of loan asset-based securities that are results of securitizing the second loan assets, based on information on the loan asset-based securities, and outputting a second analysis result; a computer-readable program code means for executing a third step of comparing the first analysis result outputted in the first step and the second analysis result outputted in the second step and extracting a difference between the second portfolio and the first portfolio; and a computer-readable program code means for executing a fourth step of changing examination conditions for examining the users when the money or product is lent to the users, based on the difference extracted in the third step.

As described above, according to the loan asset managing system and the loan asset managing method, and the recording medium and the computer program product therefor according to the present invention, the first portfolio in the first loan assets formed by lending money or a product to users according to the financial product conditions is first analyzed based on the loan asset information that is the information on the first loan assets and the first analysis result is outputted. Next, based on the information on the loan asset-based securities that are the results of securitizing the second loan assets, the second portfolio in the second loan assets is analyzed in relation to the current values of the loan asset-based securities and the second analysis result is outputted. Next, the first analysis result and the second analysis result are compared and the difference between the second portfolio and the first portfolio is extracted. Next, based on the extracted difference, the examination conditions for examining the users when the money or product is lent to the users are changed. Through these processes, the examination conditions for examining users who want to use loan assets can be changed to such examination conditions that the loan assets have a higher value portfolio. In short, by enhancing the value of the portfolio of the loan assets (residential mortgages), the value of the loan assets (residential mortgages) can be enhanced.

BRIEF DESCRIPTION OF THE DRAWINGS

FIG. 5 is a chart showing a constitution example of a user information DB 43a shown in FIG. 4;

FIG. 6A and FIG. 6B are charts showing concrete examples of processing performed by a processing section 46 for analyzing residential mortgages shown in FIG. 4; and FIG. 7 is a flowchart showing the operation of a residential mortgage managing system 12 shown in FIG. 1 for optimizing financial product conditions and examination conditions so as to enhance the value of a portfolio of residential mortgages.

DETAILED DESCRIPTION OF THE PREFERRED EMBODIMENTS

Figure 1:
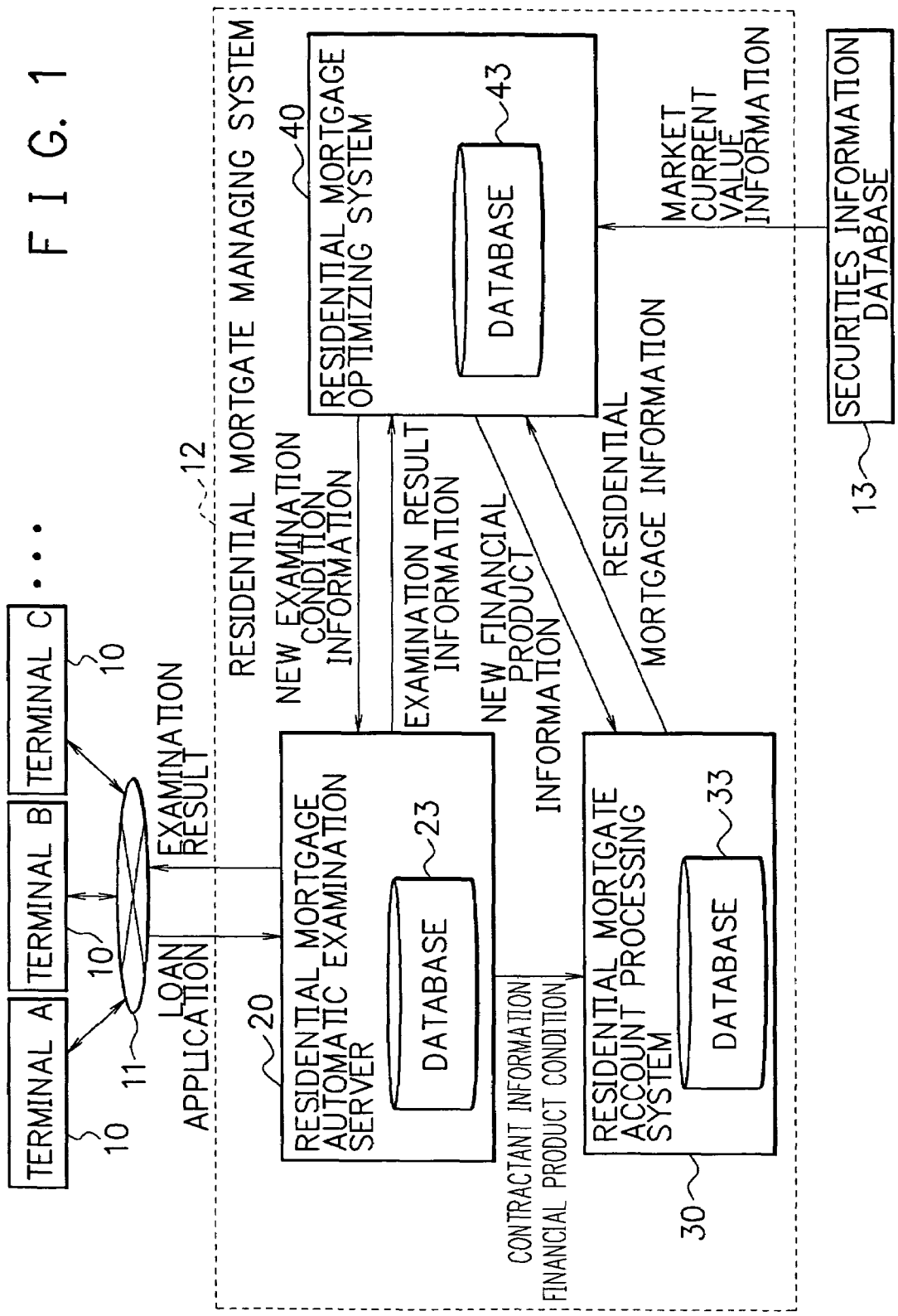
FIG. 1 is a diagram showing the schematic configuration of a residential mortgage managing system according to an embodiment of the present invention.

Hereinafter, an embodiment of the present invention will be explained.

To begin with, the schematic configuration of a residential mortgage managing system (a loan asset managing system) according to an embodiment of the present invention will be explained using the drawing.

FIG. 1 is a diagram showing the schematic configuration of the residential mortgage managing system according to the embodiment of the present invention. In FIG. 1, the reference numeral 10 denotes a terminal A, a terminal B, a terminal C, . . . (hereinafter, referred to as a user terminal 10). The user terminal 10 is a computer terminal connectable to a network 11. Incidentally, the network 11 may be a public network such as the Internet, a leased line, or the like.

The reference numeral 12 denotes a residential mortgage managing system. The residential mortgage managing system 12 is a system realizing STP by processing a series of processes from the application for residential mortgages via the network 11 to the determination of examination and financial product conditions and repayment management. The residential mortgage managing system 12 is also a system capable of changing the financial product conditions and the examination conditions so as to enhance the value of portfolios of the residential mortgages. The reference numeral 13 is a securities information database. The securities information database 13 stores therein current value information on residential mortgage-based securities traded in the market and information on residential mortgages being claimable assets that are the bases of the residential mortgages-based securities.

The abovementioned residential mortgage managing system 12 includes a residential mortgage automatic examination server 20 that provides services such as automatic examination for the residential mortgages to the user terminal 10 via the network 11, a residential mortgage account processing system 30 that manages information on repayment, default, and the like according to the financial product conditions of contracted financial products (for residential mortgages), and a residential mortgage optimizing system 40 that optimizes portfolios of the residential mortgages to change the examination conditions used in the automatic examination by the residential mortgage automatic examination server 20 and the financial product conditions of the financial products used in the repayment management and so on by the residential mortgage account processing system 30.

The residential mortgage automatic examination server 20 includes a database 23 that stores therein information and so on necessary for the automatic examination, such as user information that is information on users using the automatic examination from the user terminal 10 and examination model information that is information on the examination conditions. The residential mortgage account processing system 30 includes a database 33 that stores therein user information on users being contractants, information on the repayment status of the users, and so on as information on contracted residential mortgages. The residential mortgage optimizing system 40 includes a database 43 that stores therein information on the current value of residential mortgage-based securities and portfolios thereof, information on portfolios of residential mortgages to be optimized, and so on as information necessary for optimizing the portfolios of the residential mortgages. The configuration of the abovementioned residential mortgage automatic examination server 20, residential mortgage account processing system 30, residential mortgage optimizing system 40, and databases included therein will be described later in detail.

Note that each of the residential mortgage automatic examination server 20, the residential mortgage account processing system 30, the residential mortgage optimizing system 40, and the user terminal 10 has, though not shown, an input unit such as a mouse or a keyboard and a display unit such as CRT (Cathode Ray Tube) or a liquid crystal display. The residential mortgage automatic examination server 20 further includes a printing unit for printing and preparing contract documents for residential mortgages. The user terminal 10 includes a browser through which the contents on the network 11 are browsable.

Next, the operation of the residential mortgage managing system 12 described above will be briefly explained.

The processes performed by the residential mortgage managing system 12 are roughly divided to two kinds. One is a series of processes from the application for residential mortgages to the determination of examination and financial product conditions and repayment management, and the other is a process for changing the financial product conditions and the examination conditions so as to enhance the value of portfolios of the residential mortgages. The series of processes from the application for a residential mortgage to the determination of the examination and financial product conditions and the repayment management will be first explained. First, the residential mortgage automatic examination server 20 receives information on the application for a residential mortgage by a user from the user terminal 10 via the network 11. Triggered by this, the residential mortgage automatic examination server 20 performs automatic examination based on information on the application for the residential mortgage and judges whether or not it is appropriate to loan the user the residential mortgage under financial product conditions that the user wants.

When the user is judged in the automatic examination as appropriate for being offered the loan, the residential mortgage automatic examination server 20 prints and prepares with the printing unit a contract document which is a necessary document for the residential mortgage contract and includes information on the user. This document is mailed to the user and submitted to a bank, a public loan corporation, or the like after processes such as sealing, and thereby the contract is formalized. Incidentally, in the above-described embodiment, the contract document is printed on paper in conformity with the current law, but this is not restrictive, and the contract may be formalized when the user terminal 10, which is imparted with a function of electronic signature or electronic sealing, affixes electronic signature or electronic sealing on an electronically prepared contract document and transmits the contract document to a predetermined transmission destination.

Next, the residential mortgage automatic examination server 20 transmits to the residential mortgage account processing system 30 the information on the contractant (user) and information on the financial product conditions concerning the residential mortgage for which the contract has been completed. Next, the residential mortgage account processing system 30 manages the repayment status and so on of the contractant based on the contractant information and the residential mortgage information such as the financial product conditions, which are received from the residential mortgage automatic examination server 20, and based on transfer information on money transfer to a designated account. As is described above, the residential mortgage managing system 12 conducts the series of processes from the application for residential mortgages to the determination of the examination and financial product conditions and the repayment management.

Next, the process for changing the financial product conditions and the examination conditions so as to enhance the value of portfolios of residential mortgages will be explained. First, the residential mortgage optimizing system 40 obtains information on residential mortgages for which the contract has been completed and which have not been securitized yet from the residential mortgage account processing system 30. Based on this information, the residential mortgage optimizing system 40 analyzes a first portfolio of the obtained residential mortgages. Next, the residential mortgage optimizing system 40 obtains from the securities information database 13 information such as current value information on residential mortgage-based securities. Based on this information, the residential mortgage optimizing system 40 analyzes a second portfolio of residential mortgages (second loan assets) that are to be the bases of residential mortgage-based securities having a relatively high current value. Therefore, the second portfolio is a portfolio having a high value (having a high market appraisal).

Next, the residential mortgage optimizing system 40 compares the analyzed second portfolio and first portfolio to extract a difference therebetween. Next, the residential mortgage optimizing system 40 changes the examination conditions for the automatic examination and the financial product conditions for the financial products based on the extracted difference so that the first portfolio forms a portfolio similar to the second portfolio having a high value. Next, the residential mortgage optimizing system 40 optimizes the degrees of the abovementioned changes in the examination conditions for the automatic examination and in the financial product conditions for the financial products in consideration of information on past examination results, salability of financial products, and so on, and calculates the optimized examination conditions and financial product conditions.

Next, the residential mortgage optimizing system 40 transmits the optimized examination conditions for the automatic examination to the residential mortgage automatic examination server 20 and transmits to the residential mortgage account processing system 30 new financial products including the optimized financial product conditions for the financial products. Then, the residential mortgage automatic examination server 20 updates the examination conditions for the automatic examination. Meanwhile, in the residential mortgage account processing system 30, information on the new financial products for which the financial product conditions are changed is stored. Note that the information on the new financial products is further stored in the residential mortgage automatic examination server 20 when the changed examination conditions and the new financial products are optimized as a unit.

As is described above, the residential mortgage managing system 12 performs the process for changing the financial product conditions and the examination conditions so as to enhance the value of portfolios of residential mortgages. Incidentally, the timing of performing this process may be periodic at arbitrary intervals or this process may be performed when the price of residential mortgage-based securities greatly fluctuates to exceed a predetermined threshold value, or on other occasions like this.

Next, the functional configuration of the residential mortgage automatic examination server 20, the residential mortgage account processing system 30, and the residential mortgage optimizing system 40 included in the residential mortgage managing system 12 will be explained.

First, the functional configuration of the residential mortgage automatic examination server 20 will be explained using the drawing.

Figure 2:
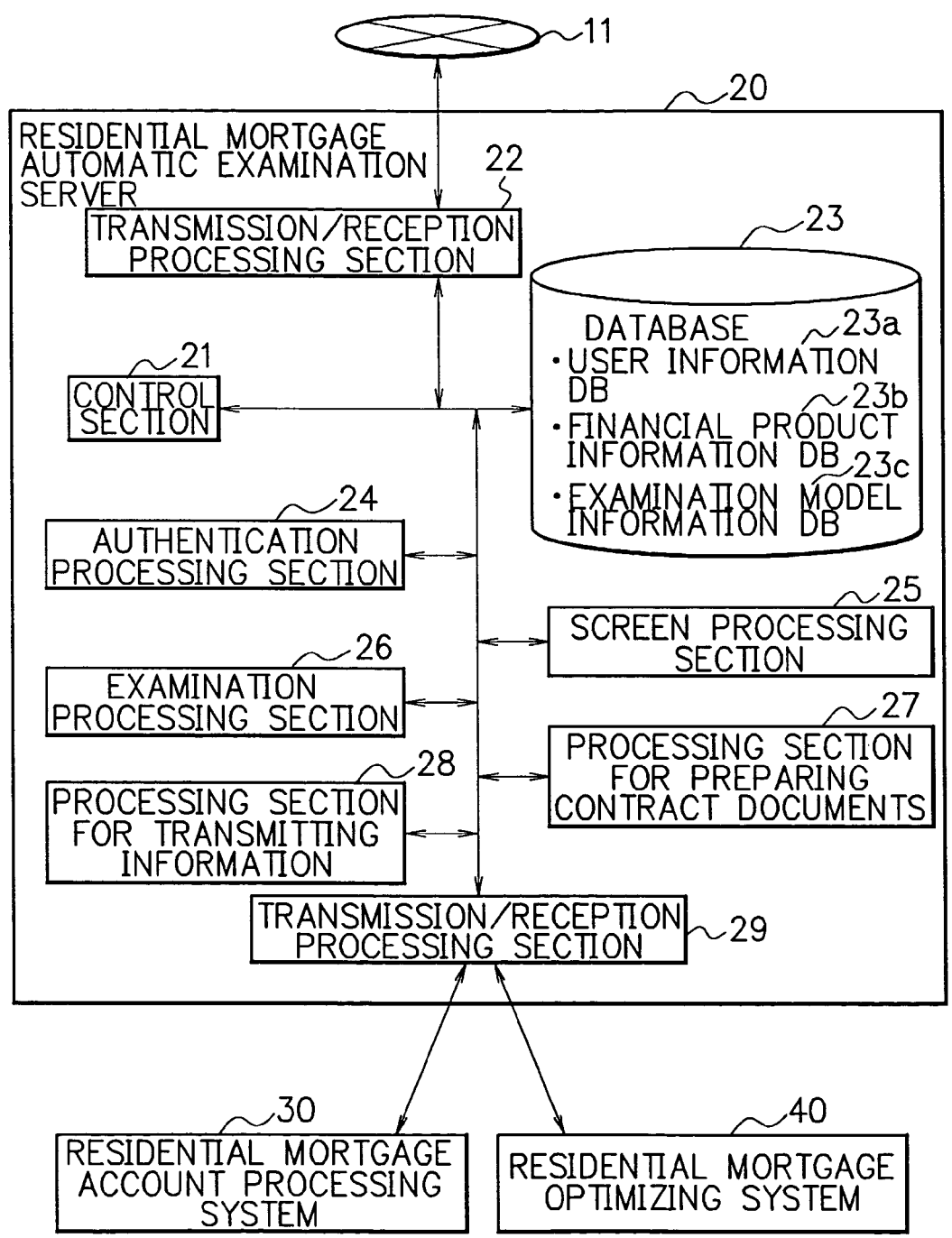
FIG. 2 is a block diagram showing the functional configuration of a residential mortgage automatic examination server 20 shown in FIG. 1.

FIG. 2 is a block diagram showing the functional configuration of the residential mortgage automatic examination server 20 shown in FIG. 1. In FIG. 2, the reference numeral 21 denotes a control section. The control section 21 controls data flow inside the residential mortgage automatic examination server 20. The reference numeral 22 denotes a transmission/reception processing section. The transmission/reception processing section 22 communicates with the user terminal 10 via the network 11.

The abovementioned database 23 includes the following databases. A user information DB (database) 23a stores therein the user information that is information on users using the automatic examination from the user terminal 10. The user information is information such as examination information, authentication information, history information, and so on concerning the users. The examination information is information necessary for the examination for residential mortgages such as the name, age, occupation, address, yearly income, family make-up, deposits and savings, health condition, and so on of each user. The authentication information is information for authenticating the users that are referred to when accesses from the user terminal 10 to the residential mortgage automatic examination server 20 are to be authorized. The history information is input information and information on the examination results when the users used in the past services such as the automatic examination provided by the residential mortgage automatic examination server 20.

A financial product information DB 23b stores therein the financial product information that is information on financial products of residential mortgages. Information on financial product conditions (amount, term, interest rate type (variable/fixed), property details) of the residential mortgages and so on are included in the abovementioned financial product information, being classified by the kind of financial product (by each name, by each identification number, or the like).

An examination model information DB 23c stores therein the examination model information that is information necessary for the automatic examination. The examination model information is information on the examination conditions for judging whether or not a user is to be loaned a residential mortgage under the financial product conditions designated by the user. The examination model information stored in this examination model information DB 23c is updated by the aforesaid residential mortgage optimizing system 40 when necessary.

Next, the explanation will return to the schematic configuration of the residential mortgage automatic examination server 20.

The reference numeral 24 is an authentication processing section. The authentication processing section 24 authenticates each user upon receipt of authentication request information from the user terminal 10 via the network 11, referring to the authentication information stored in the abovementioned user information DB 23a. Note that the authentication request information is information effective for authenticating the user, such as the name and telephone number of the user, and it is suitable to use a user ID and password, physical information such as a fingerprint, an electronic mail address, or the like. The authentication processing section 24 also performs processing for displaying on the user terminal 10 a screen for prompting the user to input the authentication request information.

The reference numeral 25 denotes a screen processing section. The screen processing section 25 performs processing for displaying on the user terminal 10 a screen for prompting each user to select a financial product in order for the user to use the automatic examination service, a screen for prompting each user to input necessary information for the examination such as personal information and the financial product conditions, and so on. This screen processing section 25 makes the abovementioned screens displayed on the user terminal 10 by, for example, transmitting to the user terminal 10 screen information written, for example, in an HTML format browsable through the browser. The abovementioned screens displayed on the user terminal 10 also have a function of transmitting the selected information and the inputted information to the residential mortgage automatic examination server 20.

The reference numeral 26 denotes an examination processing section (examining means). The examination processing section 26 performs the automatic examination based on the examination model information stored in the examination model information DB 23c and the user information received from the user terminal 10. The examination processing section 26 is also capable of reexamining the user based on the user information used in the past examination and the changed examination conditions when the residential mortgage optimizing system 40 changes the examination conditions. Then, when the user passes the automatic examination, the residential mortgage automatic examination server 20 gives a notification to that effect to the user passing the examination.

The reference numeral 27 is a processing section for preparing contract documents. The processing section 27 for preparing contract documents prepares documents necessary for the application for a residential mortgage based on finalized contract of the residential mortgage. The reference numeral 28 denotes a processing section for transmitting information. The processing section 28 for transmitting information transmits the information on the residential mortgage for which the contract has been finalized to the residential mortgage account processing system 30 via a transmission/reception processing section 29 which will be described later. The transmission/reception processing section 29 communicates with the residential mortgage account processing system 30 and the residential mortgage optimizing system 40 via the leased line.

With the configuration described above, the residential mortgage automatic examination server 20 provides the automatic examination service for residential mortgage to the user terminal 10. Further, the residential mortgage automatic examination server 20 transmits the information on the residential mortgage for which the contract has been finalized to the residential mortgage account processing system 30. The residential mortgage automatic examination server 20 also performs the automatic examination based on the examination conditions updated by the residential mortgage optimizing system 40.

Next, the functional configuration of the residential mortgage account processing system 30 will be explained using the drawing.

Figure 3:
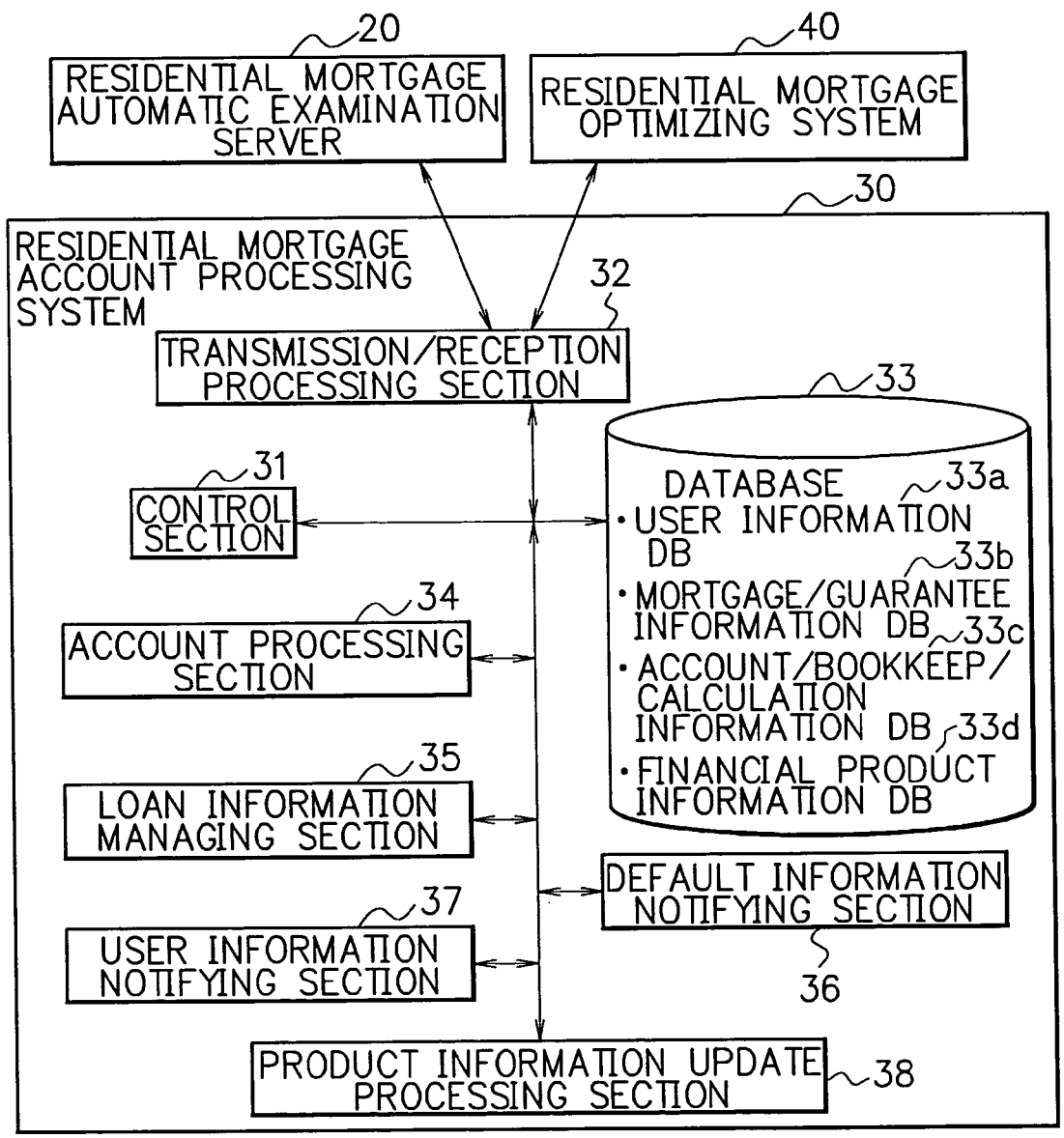
FIG. 3 is a block diagram showing the functional configuration of a residential mortgage account processing system 30 shown in FIG. 1.

FIG. 3 is a block diagram showing the functional configuration of the residential mortgage account processing system 30 shown in FIG. 1. In FIG. 3, the reference numeral 31 denotes a control section. The control section 31 controls data flow inside the residential mortgage account processing system 30. The reference numeral 32 denotes a transmission/reception processing section. The transmission/reception processing section 32 communicates with the residential mortgage automatic examination server 20 and the residential mortgage optimizing system 40 via the leased line.

The aforesaid database 33 includes the following databases. A user information DB (database) 33a stores therein the user information that is information on users who have entered into contract for residential mortgages. This user information is information such as attribute information, residential mortgage information, and repayment information concerning the users. The attribute information is information similar to the user information used in the residential mortgage examination such as the name, age, occupation, address, yearly income, family make-up, deposits and savings, health condition, and so on of each user. The residential mortgage information is information for specifying the kind of residential mortgage products for which the users have entered into contract (names of financial products, special contract items, and so on) and information on the financial product conditions thereof (amount, term, interest rate type (variable/fixed), property details, and so on). The repayment information is information on the repayment status of the users such as information on the past repayment history, advanced repayment information when the users make repayment before due date, default information when the users default on repayment.

A mortgage/guarantee information DB 33b stores therein mortgage/guarantee information that is information on mortgages and guarantees held by each residential mortgage included in the residential mortgage information stored in the user information DB 33a. An account/bookkeeping/calculation information DB 33c stores therein information on current loan balance, a monthly repayment amount, and so on by each user, in which the repayment status of each user, changes in the variable interest rate and contents of the financial products, and so on are reflected.

A financial product information DB 33d stores therein the financial product information that is information on the interest rates and contents of various financial products. When the interest rates or the contents of the financial products are changed, this change is reflected in the financial product information stored in the financial product information DB 33d when necessary.

In the foregoing, each of the databases included in the database 33 is explained. The configuration thereof is not limited to that described above, and any arbitrary configuration may be adopted as long as each of the databases has such a configuration that the aforesaid information is stored therein and is classified by each user or each kind of the residential mortgages for reference.

Next, the explanation will return to the schematic configuration of the residential mortgage account processing system 30.

The reference numeral 34 denotes an account processing section. The account processing section 34 calculates current loan balance, a monthly repayment amount, and so on in which the repayment status of each user, the changes in the variable interest rates and contents of the financial products, and so on are reflected, by referring to the user information DB 33a for the residential mortgage information, to the mortgage/guarantee information DB 33b for the mortgage/guarantee information, and to the financial product information DB 33d for the financial product information. The reference numeral 35 denotes a loan information managing section. The loan information managing section 35 notifies each user of the loan balance and the repayment amount calculated by the account processing section 34 and confirms the repayment status to manage loan information. In short, the management of the residential mortgages of the financial products having the financial product conditions changed by the residential mortgage optimizing system 40 is realized by the account processing section 34 and the loan information managing section 35 (loan asset managing means).

The reference numeral 36 denotes a default information notifying section. The default information notifying section 36 manages information on user's default of repayment and transmits this information to the residential mortgage optimizing system 40 at an arbitrary time. The reference numeral 37 denotes a user information notifying section. The user information notifying section 37 manages advanced repayment information when users make repayment of a larger amount than the repayment amount before due date, the change of the information on the users (address, bank account numbers, and so on), and so on and transmits the user information including the advanced repayment information to the residential mortgage optimizing system 40 at an arbitrary time. The reference numeral 38 denotes a processing section for updating product information. The processing section 38 for updating product information updates the financial product information stored in the financial product information DB 33*d* when receiving the information on the new financial products from the residential mortgage optimizing system 40.

By the processes performed by the residential mortgage automatic examination server 20 and the residential mortgage account processing system 30 explained above, the residential mortgage managing system 12 performs the processing for the series of processes from the application for the residential mortgages to the determination of the examination and financial product conditions and the repayment management.

Next, the functional configuration of the residential mortgage optimizing system 40 will be explained using the drawing.

Figure 4:
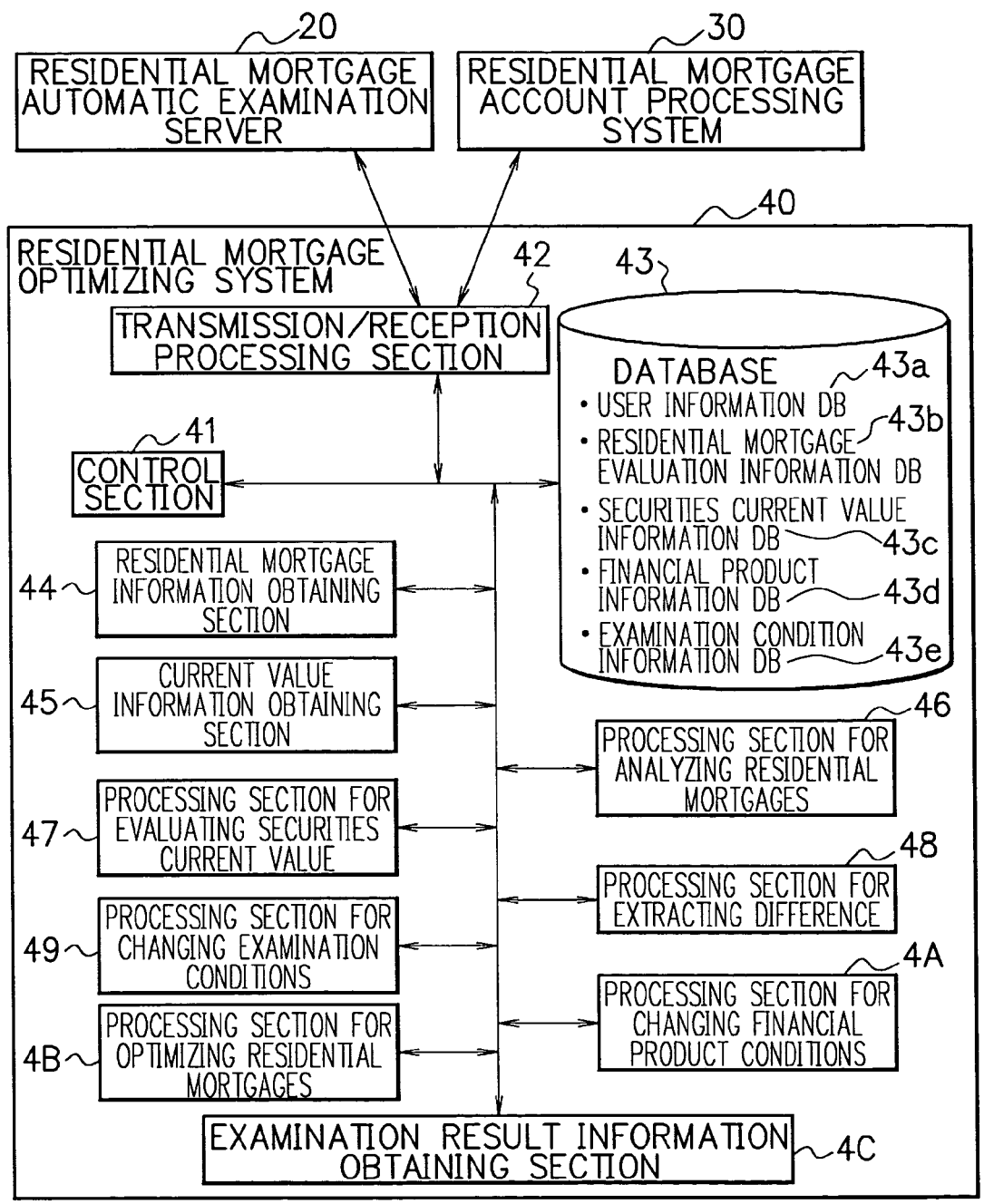
FIG. 4 is a block diagram showing the functional configuration of a residential mortgage optimizing system 40 shown in FIG. 1.

FIG. 4 is a block diagram showing the functional configuration of the residential mortgage optimizing system 40 shown in FIG. 1. In FIG. 4, the reference numeral 41 denotes a control section. The control section 41 controls data flow inside the residential mortgage optimizing system 40. The reference numeral 42 denotes a transmission/reception processing section. The transmission/reception processing section 42 communicates with the residential mortgage automatic examination server 20 and the residential mortgage account processing system 30 via the leased line.

The aforesaid database 43 includes the following databases. A user information DB 43*a* stores therein the user information that is information on users who have entered into contract of residential mortgages whose portfolios are to be evaluated. This user information is information such as attribute information, residential mortgage information, and repayment information concerning the users. The attribute information is information used in the residential mortgage examination such as the name, age, occupation, address, yearly income, family make-up, deposits and savings, health condition, and so on of each user. The residential mortgage information is information for specifying the kind of residential mortgage products for which the users have entered into contract (financial product names, special contract items, and so on), information on the financial product conditions (amount, term, interest rate type (variable/fixed), property details, and so on), information on mortgages or guarantee deposits, and so on. The repayment information is information on the repayment status of the users such as information on the past repayment history, advanced repayment information when the users make repayment before due date, and default information when the users default on repayment.

A residential mortgage evaluation information DB 43*b* stores therein residential mortgage evaluation information that is information on the evaluation of the portfolios of the residential mortgages included in the residential mortgage information stored in the user information DB 43*a*. A securities current value information DB 43*c* stores therein information on the current value of residential mortgage-based securities traded in the market and portfolio information of residential mortgages that are bases of these residential mortgage-based securities in a manner that they are related to each other.

A financial product information DB 43*d* stores therein the financial product information that is information on the interest rates and contents of various financial products. An examination condition information DB 43*e* stores therein the information on the examination conditions used in the automatic examination conducted by the residential mortgage automatic examination server 20.

In the foregoing, each of the databases included in the database 43 is explained, but the configuration thereof is not limited to that described above and they may have any configuration as long as the respective information described above are stored therein and is classified by each user or by each residential mortgage for reference.

Next, the explanation will return to the schematic configuration of the residential mortgage optimizing system 40.

The reference numeral 44 denotes a residential mortgage information obtaining section. The residential mortgage information obtaining section 44 obtains from the residential mortgage account processing system 30 information that is information on the residential mortgages whose portfolios are to be evaluated, and that is to be stored in the user information DB 43*a* as the user information. The reference numeral 45 denotes a current value information obtaining section. The current value information obtaining section 45 obtains the information to be stored in the securities current value information DB 43*c* such as the current value of the residential mortgage-based securities. The reference numeral 46 denotes a processing section for analyzing residential mortgages (loan asset analyzing means). The processing section 46 for analyzing residential mortgages refers to the user information DB 43*a* for the residential mortgage information (loan asset information) that is the information on the residential mortgages obtained by the residential mortgage information obtaining section 44 to analyze the first portfolio of the residential mortgages included in the residential mortgage information and output a first analysis result. Here, a concrete constitution example of the user information DB 43*a* will be shown and a concrete example of processes performed by the processing section 46 for analyzing residential mortgages will be explained, using the drawing.

FIG. 5 is a diagram showing a configuration example of the user information DB 43*a* shown in FIG. 4. As shown in FIG. 5, information such as the age, occupation, yearly income, interest rate, loan amount, . . . and so on is stored, being classified by each user name.

FIG. 6A and FIG. 6B are charts showing concrete examples of processes performed by the processing section 46 for analyzing residential mortgages shown in FIG. 4. Here, two examples in FIG. 6A and FIG. 6B are shown. In FIG. 6A, the reference numeral 70 denotes one aggregate of residential mortgages with the fixed interest rates of 5% or lower, which are extracted from the user information DB 43*a* shown in FIG. 5. The processing section 46 for analyzing residential mortgages analyzes the first portfolio for the aggregate 70 as shown in, for example, in FIG. 6A. To be more specific, the extracted residential mortgages are classified into three groups A to C according to the age and yearly income of the users. The group A is the aggregate of users in their forties with the yearly income of x ten-million yen or more, users in their thirties with the yearly income of y million yen or more, or users in their twenties with the yearly income of z million yen or more, and this group A occupies 30% of the aggregate 70. The group B is the aggregate of users in their forties with the yearly income of r million yen or more, users in their thirties with the yearly income of s million yen or more, or users in their twenties with the yearly income of t million yen or more, and this group B occupies 50% of the aggregate 70 (note that 10x>r, y>s, and z>t). The group C is the aggregate of users in their forties with the yearly income of less than r million yen, users in their thirties with the yearly income of less than s million yen, or users in their twenties with the yearly income of less than t million yen, and this group C occupies 20% of the aggregate 70.

Next, another example of portfolio analysis for the aggregate of residential mortgages performed by the processing section 46 for analyzing residential mortgages will be explained. In FIG. 6B, the reference numeral 71 denotes one aggregate of residential mortgages extracted from the user information DB 43a shown in FIG. 5, the loan amount thereof being 80 million yen or less. The processing section 46 for analyzing residential mortgages analyzes the first portfolio for the aggregate 71 as shown in, for example, FIG. 6B. To be more specific, the extracted residential mortgages are classified into four groups a to d by user's occupation. The group a is the aggregate of users whose occupation is financial business and occupies 25% of the aggregate 71. The group b is the aggregate of users whose occupation is construction business and occupies 15% of the aggregate 71. The group c is the aggregate of users whose occupation is retail business and occupies 20% of the aggregate 71. The group d is the aggregate of users whose occupation is other than financial business, construction business, and retail business and occupies 40% of the aggregate 71.

As is described above, the processing section 46 for analyzing residential mortgages performs grouping, using items that are stored in the user information DB 43a as the residential mortgage information and that are determining factors (age, yearly income, occupation, and so on) of rating of residential mortgage-based securities when residential mortgages are securitized, and analyzes the constitution thereof. In short, the processing section 46 for analyzing residential mortgages analyzes the portfolio for the aggregate of the residential mortgages.

It should be noted that the items and the number of groups used for the grouping are not limited to those described above, and one of the items that vary in accordance with the fluctuation of the rating or price of residential mortgage-based securities may be used, or the combination of the plural items among such items may be used. In extracting the aggregate of residential mortgages, residential mortgages under an arbitrary category such as the kind of financial product, the kind of interest rate, or the attribute of users (occupation, age, . . . ) may be extracted as the aggregate.

The reference numeral 47 denotes a processing section for evaluating securities current value (securities current value evaluating means). Based on the current value information obtained by the current value information obtaining section 45, in other words, the current value information of the residential mortgage-based securities stored in the securities current value information DB 43c, and information on second residential mortgages (second loan assets) that are bases of these residential mortgage-based securities, the processing section 47 for evaluating securities current value analyzes the second portfolio in relation to the current value of the residential mortgage-based securities, and outputs a second analysis result. In this embodiment, the processing section 47 for evaluating securities current value processes the residential mortgage-based securities having a relatively high current value among the residential mortgage-based securities stored in the securities current value information DB 43c. Therefore, the second portfolio of the residential mortgage-based securities having a high current value is a portfolio having a high value, and the processing section 47 for evaluating securities current value outputs the second portfolio having a high value as the second analysis result.

The reference numeral 48 denotes a processing section for extracting difference (difference extracting means). The processing section 48 for extracting difference compares the first analysis result outputted by the processing section 46 for analyzing residential mortgages and the second analysis result outputted by the processing section 47 for evaluating securities current value to extract a difference between the second portfolio and the first portfolio. The reference numeral 49 denotes a processing section for changing examination conditions (examination condition changing means). The processing section 49 for changing examination conditions changes the examination conditions for examining users who want to use residential mortgages, based on the difference extracted by the processing section 48 for extracting difference.

A concrete example will be given for explanation. First, when the processing section 48 for extracting difference judges that the ratio of users whose occupation is financial business in the second portfolio is higher than that in the first portfolio, it extracts this portion as a difference. Next, the processing section 49 for changing examination conditions loosens the examination conditions for users whose occupation is financial business so as to increase the number of users whose occupation is financial business, based on the difference extracted by the processing section 48 for extracting difference, the difference indicating that "the number of users whose occupation is financial business is larger". In other words, the residential mortgage optimizing system 40 is capable of changing the examination conditions so as to reduce the difference between the second portfolio having a high value and the first portfolio. Consequently, the residential mortgage automatic examination server 20 examines users of residential mortgages based on the updated examination conditions, which makes it possible to form the aggregate of residential mortgages having a high value portfolio that facilitates securitization at high price.

The reference symbol 4A denotes a processing section for changing financial product conditions (financial product condition changing means). The processing section 4A for changing financial product conditions changes the financial product conditions of the financial products for the residential mortgages based on the difference extracted by the processing section 48 for extracting difference. To be more specific, similarly to the above-described change in the examination conditions, in introducing financial products to users for selection, the residential mortgage automatic examination server 20 is capable of giving higher priority to the financial products whose financial product conditions are changed so that the residential mortgages have a higher value portfolio. To show a concrete example, when residential mortgages whose term is longer are traded at a higher price as residential mortgage-based securities, new financial products including financial product conditions in which the term is long can be given higher priority in introduction.

The reference symbol 4B denotes a processing section for optimizing residential mortgages (optimizing means). The processing section 4B for optimizing residential mortgages adjusts the degree of changing the examination conditions made by the processing section 49 for changing examination conditions and the degree of changing the financial product conditions made by the processing section 4A for changing financial product conditions to thereby optimize these degrees. To be more specific, since no consideration is given to salability of the financial products and the past examination results when changing the examination conditions made by the processing section 49 for changing examination conditions and the financial product conditions made by the processing section 4A for changing financial product conditions, absurdly great change may possibly be instructed. Therefore, the processing section 4B for optimizing residential mortgages refers to information such as current salability of the financial products and the past examination results to adjust the degree of the change in the examination conditions made by the processing section 49 for changing examination conditions and the degree of the change in the financial product conditions made by the processing section 4A for changing financial product conditions, thereby optimizing these conditions.

The reference symbol 4C is an examination result information obtaining section. The examination result information obtaining section 4C obtains the information on the past examination results referred to by the processing section 4B for optimizing residential mortgages from the residential mortgage automatic examination server 20. As is described above, the residential mortgage optimizing system 40 is capable of changing the examination conditions for the automatic examination and the financial product conditions of the financial products so as to enhance the value of portfolios of residential mortgages. Further, the residential mortgage optimizing system 40 is capable of adjusting amounts of the change in the examination conditions for the automatic examination and of the change in the financial product conditions of the financial products to optimize these amounts by referring to the salability of the financial products and strictness of the examination conditions.

Incidentally, each of the processing sections of the residential mortgage automatic examination server 20, the residential mortgage account processing system 30, and the residential mortgage optimizing system 40 shown in FIG. 2, FIG. 3, and FIG. 4 may be realized by specialized hardware or each of the processing sections may have such a structure that it is constituted by a memory and a CPU (central processing unit) and the function thereof is realized by reading a program for realizing the function of each of the processing sections into a memory and executing this program.

The abovementioned memory is constituted by a hard disk unit, a magneto-optical disk unit, a nonvolatile memory such as a flash memory, a read-only recording medium such as CD-ROM, a volatile memory such as RAM (Random Access Memory), or a computer-readable and -writable recording medium constituted of the combination of the above.

Next, the operation of the abovementioned residential mortgage managing system 12 will be explained.

As described above, the processes performed by the residential mortgage managing system 12 are roughly divided into two kinds. To begin with, the explanation will be given on the case when the residential mortgage managing system 12 performs the processing for the series of processes from the application for a residential mortgage to the determination of the examination and financial product conditions and the repayment management. First, the transmission/reception processing section 22 of the residential mortgage automatic examination server 20 receives the authentication information on a user from the user terminal 10 via the network 11. Next, the authentication processing section 24 refers to the user information DB 23a to authenticate the user based on the authentication information received by the transmission/reception processing section 22. When the user is authenticated here, the screen processing section 25 displays on the user terminal 10 the screen to which information on the residential mortgage application is to be inputted. With this screen, the selection of a financial product of the residential mortgage and the user information are inputted to the user terminal 10. Next, the transmission/reception processing section 22 of the residential mortgage automatic examination server 20 receives the information on the application for the residential mortgage from the user terminal 10. Then, the examination processing section 26 of the residential mortgage automatic examination server 20 performs the automatic examination based on the information on the application for the residential mortgage and judges whether or not the user is appropriate for being loaned the residential mortgage under financial product conditions that the user wants.

When the examination processing section 26 judges the user as appropriate for being loaned the residential mortgage in the automatic examination, the processing section 27 for preparing contract documents prepares a contract document that is a necessary document for the residential mortgage contract and in which information on the user is written, by printing with the printing unit. When this document is mailed to the user and submitted, after processes such as sealing, to a bank, a public loan corporation, or the like, the contract is formalized. Next, the processing section 28 for transmitting information transmits to the residential mortgage account processing system 30 the information on the contractant (user) and the information on the financial product conditions regarding the residential mortgage for which the contract has been completed.

Next, the transmission/reception processing section 32 of the residential mortgage account processing system 30 receives the residential mortgage information such as the contractant information and the financial product condition information from the residential mortgage automatic examination server 20. Then, the account processing section 34 and the loan information managing section 35 manage the repayment status and so on of the contractant based on the received residential mortgage information such as the contractant information and the financial product conditions, the money transfer information on the money transfer to a designated account, and so on. When the user defaults, the default information notifying section 36 notifies the default information to the residential mortgage optimizing system 40. As described above, the residential mortgage managing system 12 performs the processing for the series of processes from the residential mortgage application to the determination of the examination and financial product conditions and the repayment management.

Next, through the use of the drawing, the explanation will be given on the case when the residential mortgage managing system 12 processes the optimization of the financial product conditions and the examination conditions so as to enhance the value of portfolios of residential mortgages. FIG. 7 is a flowchart showing the operation of the residential mortgage managing system 12 shown in FIG. 1 when it optimizes the financial product conditions and the examination conditions so as to enhance the value of a portfolio of residential mortgages. First, the residential mortgage information obtaining section 44 of the residential mortgage optimizing system 40 obtains from the residential mortgage account processing system 30 the information on residential mortgages for which the contract has been completed and that are not yet securitized, though this step is not shown in FIG. 7. Then, the information on the residential mortgages obtained by the residential mortgage information obtaining section 44 is stored in the user information DB 43*a*. Similarly, the current value information obtaining section 45 also obtains the information on residential mortgage-based securities from the securities information database 13 and the obtained information is stored in the securities current value information DB 43*c*.

Next, the processing section 46 for analyzing residential mortgages reads from the user information DB 43*a* the information on the residential mortgages to be grouped in one aggregate and analyzes the first portfolio of these residential mortgages (Step S1). Next, the processing section 47 for evaluating securities current value obtains information such as the information on the current value of the residential mortgage-based securities from the securities current value information DB 43*c* and analyzes the second portfolio of residential mortgages being the bases of residential mortgage-based securities with a relatively high current value (Step S2).

Next, the processing section 48 for extracting difference compares the analyzed second portfolio and first portfolio to extract the difference therebetween (Step S3). Next, the processing section 49 for changing examination conditions changes the examination conditions for the automatic examination based on the difference extracted by the processing section 48 for extracting difference (Step S4). Similarly, the processing section 4A for changing financial product conditions changes the financial product conditions of the financial products based on the difference extracted by the processing section 48 for extracting difference (Step S5). Next, taking the past examination result information, the salability of financial products, and so on into consideration, the processing section 4B for optimizing residential mortgages optimizes the degree of the abovementioned changes in the examination conditions for the automatic examination and the financial product conditions of the financial products, and calculates the optimized examination conditions and financial product conditions (Step S6).

Next, the residential mortgage optimizing system 40 runs various simulations under the examination conditions and the financial product conditions optimized by the processing section 4B for optimizing residential mortgages and judges whether or not these conditions are optimized (Step S7). Here, when these conditions are judged as not being optimized (NO in Step S7), the procedure returns to Step S4 to restart from the change in the examination conditions. On the other hand, when they are judged as being optimized (YES in Step S7), the optimization processes of the examination conditions and the financial product conditions are finished.

Further, the residential mortgage optimizing system 40 transmits the optimized examination conditions for the automatic examination to the residential mortgage automatic examination server 20, and transmits new financial products including the optimized financial product conditions of the financial products to the residential mortgage account processing system 30. Then, in the residential mortgage automatic examination server 20, the examination conditions for the automatic examination are updated. Meanwhile, in the residential mortgage account processing system 30, information on the new financial products whose financial product conditions are changed is stored. As described above, the residential mortgage managing system 12 processes the optimization of the financial product conditions and the examination conditions so as to enhance the value of the portfolio of the residential mortgages.

Incidentally, in the above-described embodiment, the residential mortgage automatic examination server 20, the residential mortgage account processing system 30, and the residential mortgage optimizing system 40 are connected to one another by the leased line, but this is not restrictive, and they may be connected to one another by a public network such as the Internet. In this case, it is possible to have the transmission/reception processing section 22 of the residential mortgage automatic examination server 20 also serve as the transmission/reception processing section 29 thereof, and the transmission/reception processing section 32 of the residential mortgage account processing system 30 and the transmission/reception processing section 42 of the residential mortgage optimizing system 40 have an Internet connection function.

Further, the embodiment of the present invention can be realized by the execution of a computer program by a computer. Moreover, a means for supplying the computer with the computer program, for example, a computer-readable recording medium on which such a computer program is recorded, or a transmission medium for transmitting such a computer program is also applicable as an embodiment of the present invention. Further, a computer program product such as a computer-readable recording medium on which the abovementioned computer program is recorded is also applicable as an embodiment of the present invention. The abovementioned computer program, recording medium, transmission medium, and computer program product are considered to be included within the scope of the present invention.

The "computer-readable recording medium" means a transportable medium such as a flexible disk, a magneto-optical disk, ROM, and CD-ROM, or a storage unit such as a hard disk housed in a computer system. Further, the "computer-readable recording medium" is to be considered to include those retaining a computer program for certain hours such as a volatile memory (RAM) inside a computer system that becomes a server or a client when the computer program is transmitted via a network such as the Internet or a communication link such as a telephone line.

The abovementioned computer program may be transmitted from a computer system in which this computer program is stored in a storage unit or the like thereof to another computer system via a transmission medium or by a transmission wave in the transmission medium. Here, the "transmission medium" transmitting the computer program means a medium having a function of transmitting information, such as a network (communication network) such as the Internet and a communication link (communication line) such as a telephone line.

The abovementioned computer program may be the one for realizing a part of the aforesaid function. Further, it may be the one capable of realizing the aforesaid function when combined with a computer program already recorded in the computer system, that is, a so-called difference file (difference program).

In the foregoing, the embodiment of this invention is detailed with reference to the drawings, but it is to be understood that the concrete configuration thereof is not intended to be limited to this embodiment, and any design and so forth without departing from the spirit of the present invention are included therein.

According to a loan asset managing system and a loan asset managing method, and a recording medium and a computer program product therefor of the present invention, a first portfolio in first loan assets formed by lending money or a product to a user according to financial product conditions is first analyzed based on loan asset information that is information on the first loan assets, and a first analysis result is outputted. Next, a second portfolio in second loan assets is analyzed in relation to the current value of loan asset-based securities that are the results of the second loan assets, based on information on the loan asset-based securities, and a second analysis result is outputted. Next, the first analysis result and the second analysis result are compared to extract a difference between the second portfolio and the first portfolio. Next, examination conditions for examining the user when the money or product is lent to the user can be changed based on the extracted difference.

Through the above processes, the examination conditions for examining users who want to use loan assets can be changed so that the loan assets have a higher value portfolio. In other words, the value of the loan assets (residential mortgages) can be enhanced by enhancing the value of the portfolio of the loan assets (residential mortgages). Further, the enhancement of the value of the portfolio makes it possible to acquire optimized profitability and loan assets with high safety, and at the same time, to facilitate securitization at a high price, thereby maintaining high asset liquidity.

The present embodiments are to be considered in all respects as illustrative and no restrictive, and all changes which come within the meaning and range of equivalency of the claims are therefore intended to be embraced therein. The invention may be embodied in other specific forms without departing from the spirit or essential characteristics thereof.

What is claimed is:

1. A loan asset managing system, comprising:
   a loan asset analyzing means that analyzes a first portfolio that is aggregate of loan asset information for which contract has been completed and that are not securitized, and outputs a first analysis result;
   a securities current value evaluating means that analyzes a second portfolio that is aggregate based on current value information of securitized loan assets and second loan asset information that are basis of the securitized loan asset, and outputs a second analysis result;
   a difference extracting means that compares said first analysis result outputted by said loan asset analyzing means and said second analysis result outputted by said securities current value evaluating means and extracts a difference between said second portfolio and said first portfolio; and
   an examination condition changing means that changes examination conditions for examining users when money or product is lent to the users, based on the difference extracted by said difference extracting means.

2. The payment processing system of claim 1, wherein at least one of adapter modules is configured to communicate dam with a mobile communications device consistent with an secure socket layer secure electronic transaction communications protocol thereby ensuring a high level of security in communicating the customer financial account data.

3. The loan asset managing system according to claim 2, further comprising:
   an optimizing means that makes adjustment of a degree of the change in said examination conditions made by said examination condition changing means and a degree of the change in said financial product conditions made by said financial product condition changing means to optimize these degrees.

4. The loan asset managing system according to claim 1, further comprising:
   an examining means that examines said users based on information on said users and said examination conditions changed by said examination condition changing means.

5. The loan asset managing system according to claim 2, further comprising:
   an examining means that examines said users based on information on said users and said examination conditions changed by said examination condition changing means.

6. The loan asset managing system according to claim 3, further comprising:
   an examining means that examines said users based on information on said users and said examination conditions changed by said examination condition changing means.

7. The loan asset managing system according to claim 1, further comprising:
   a loan asset managing means that manages a loan asset of said financial product for which said financial product conditions are set, based on said financial product conditions changed by said financial product condition changing means.

8. The loan asset managing system according to claim 2, further comprising:
   a loan asset managing means that manages a loan asset of said financial product for which said financial product conditions are set, based on said financial product conditions changed by said financial product condition changing means.

9. The loan asset managing system according to claim 3, further comprising:
   a loan asset managing means that manages a loan asset of said financial product for which said financial product conditions are set, based on said financial product conditions changed by said financial product condition changing means.

10. The loan asset managing system according to claim 4, wherein said examining means reexamines said users based on user information used in past examination and said changed examination conditions when said examination condition changing means changes said examination conditions.

11. The loan asset managing system according to claim 5, wherein said examining means reexamines said users based on user information used in past examination and said changed examination conditions when said examination condition changing means changes said examination conditions.

12. The loan asset managing system according to claim 6, wherein said examining means reexamines said users based on user information used in past examination and said changed examination conditions when said examination condition changing means changes said examination conditions.

13. A computer loan asset managing method, comprising:
   a first step of using a process for electronically analyzing a first portfolio that is an aggregate of loan asset information stored in a computer memory for which a contract has been completed and that is not securitized, and outputting a first analysis result;
   a second step of using a process for electronically analyzing a second portfolio that is aggregated based on current value information of securitized computer loan assets and second loan asset information stored in the computer memory that are basis of the securitized computer loan assets and outputting a second analysis result;

a third step of using a process for electronically comparing said first analysis result outputted in said first step and said second analysis result outputted in said second step and extracting a difference between said second portfolio and said first portfolio; and a fourth step of using a process for electronically changing examination conditions for examining users when money or product is lent to the users, based on the difference extracted in said third step.

14. The loan asset managing method according to claim 13, wherein said loan asset managing method further comprising:
a fifth step of changing financial product conditions determined beforehand by the kind of financial product used by said users, based on the difference extracted in said third step.

15. The loan asset managing method according to claim 14, further comprising:
an optimizing step of adjusting a degree of the change in said examination conditions made in said fourth step and a degree of the change in said financial product conditions made in said fifth step to optimize these degrees.

16. The loan asset managing method according to claim 13, further comprising:
an examining step of examining said users based on information on said users and said examination conditions changed in said fourth step.

17. A computer-readable recording medium on which a computer program is recorded, said computer program comprising:
a computer-readable program code means for executing a first step of analyzing a first portfolio that is aggregate of in first loan assets formed by lending money or a product to users according to financial product conditions, based on loan asset information for which contract has been completed and that are not securitized, that-is and outputting a first analysis result;

a computer-readable program code means for executing a second step of analyzing a second portfolio that is aggregate based on current value information of securitized loan assets and second loan asset information that are basis of the securitized loan asset, in second loan assets in relation to current values of loan asset tien ugtie~, and outputting a second analysis result;

a computer-readable program code means for executing a third step of comparing said first analysis result outputted in said first step and said second analysis result outputted in said second step and extracting a difference between said second portfolio and said first portfolio; and a computer-readable program code means for executing a fourth step of changing examination conditions for examining~users when~money or product is lent to the users, based on the difference extracted in said third step.

18. The computer-readable recording medium on which the computer program is recorded according to claim 17, wherein said computer program further comprises a computer-readable program code means for executing a fifth step of changing san financial product conditions determined beforehand by the kind of financial product used by said user, ef-saN based on the difference extracted in said third step.

19. A computer program product comprising:
a computer-readable program code means for executing a first step of analyzing a first portfolio that is a g.gre.gate of in first loan assets formed by lending money or a product to users according to financial product conditions, based on loan asset information for which contract has been comrleted and that are not securitized, that-4s and outputting a first analysis result;

a computer-readable program code means for executing a second step of analyzing a second portfolio that is a.g.gregate based on current value information of securitized loan assets and second loan asset information that are basis of the securitized loan asset, in second loan assets in relation to current values of loan asset and outputting a second analysis result;

a computer-readable program code means for executing a third step of comparing said first analysis result outputted in said first step and said second analysis result outputted in said second step and extracting a difference between said second portfolio and said first portfolio; and a computer-readable program code means for executing a fourth step of changing examination conditions for examining said users when said money or product is lent to the users, based on the difference extracted in said third step.

20. The computer program product according to claim 19, wherein the kind of financial~educt said computer program product further comprising:
a computer-readable program code means for executing a fifth step of changing said financial product conditions determined beforehand by the kind of financial product used by said users, based on the difference extracted in said third step.

* * * * *

UNITED STATES PATENT AND TRADEMARK OFFICE
CERTIFICATE OF CORRECTION

PATENT NO. : 7,596,527 B2
APPLICATION NO. : 10/617701
DATED : September 29, 2009
INVENTOR(S) : Moriyasu Sumi et al.

It is certified that error appears in the above-identified patent and that said Letters Patent is hereby corrected as shown below:

In the Claims:

Please delete Claim 2, at Column 19, and insert therefor:

--2. The loan asset managing system according to claim 1, wherein said loan asset managing system further comprising:
a financial product condition changing means that changes financial product conditions determined beforehand by the kind of financial product used by said users, based on the difference extracted by said difference extracting means.--

Please delete Claim 17, at Column 21 through Column 22, and insert therefor:

--17. A computer-readable recording medium on which a computer program is recorded, said computer program comprising:
a computer-readable program code means for executing a first step of analyzing a first portfolio that is aggregate of loan asset information for which contract has been completed and that are not securitized, and outputting a first analysis result;
a computer-readable program code means for executing a second step of analyzing a second portfolio that is aggregate based on current value information of securitized loan assets and second loan asset information that are basis of the securitized loan asset, and outputting a second analysis result;
a computer-readable program code means for executing a third step of comparing said first analysis result outputted in said first step and said second analysis result outputted in said second step and extracting a difference between said second portfolio and said first portfolio; and
a computer-readable program code means for executing a fourth step of changing examination conditions for examining users when money or product is lent to the users, based on the difference extracted in said third step.--

Signed and Sealed this

Tenth Day of August, 2010

David J. Kappos
*Director of the United States Patent and Trademark Office*

In the Claims:

Please delete Claims 18 and 19, at Column 22, and insert therefor:

--18. The computer-readable recording medium on which the computer program is recorded according to claim 17,
    wherein said computer program further comprises a computer-readable program code means for executing a fifth step of changing financial product conditions determined beforehand by the kind of financial product used by said user, based on the difference extracted in said third step.

19. A computer program product comprising:
a computer-readable program code means for executing a first step of analyzing a first portfolio that is aggregate of loan asset information for which contract has been completed and that are not securitized, and outputting a first analysis result;
a computer-readable program code means for executing a second step of analyzing a second portfolio that is aggregate based on current value information of securitized loan assets and second loan asset information that are basis of the securitized loan asset, and outputting a second analysis result;
a computer-readable program code means for executing a third step of comparing said first analysis result outputted in said first step and said second analysis result outputted in said second step and extracting a difference between said second portfolio and said first portfolio; and
a computer-readable program code means for executing a fourth step of changing examination conditions for examining users when money or product is lent to the users, based on the difference extracted in said third step.--

Please delete Claim 20, at Column 22, and insert therefor:

--20. The computer program product according to claim 19,
wherein said computer program product further comprising:
a computer-readable program code means for executing a fifth step of changing financial product conditions determined beforehand by the kind of financial product used by said users, based on the difference extracted in said third step.--